May 15, 1956

A. G. BODINE, JR 2,745,861

PROCESS AND APPARATUS USING RESONANT SOUND WAVE
AND SONIC FLAME FOR PRODUCTION OF CARBON
MONOXIDE, SYNTHESIS GASES, AND
SYNTHETIC HYDROCARBONS

Filed Aug. 11, 1952

INVENTOR.
ALBERT G. BODINE JR.
BY
Attorney

United States Patent Office 2,745,861
Patented May 15, 1956

2,745,861

PROCESS AND APPARATUS USING RESONANT SOUND WAVE AND SONIC FLAME FOR PRODUCTION OF CARBON MONOXIDE, SYNTHESIS GASES, AND SYNTHETIC HYDROCARBONS

Albert G. Bodine, Jr., Van Nuys, Calif.

Application August 11, 1952, Serial No. 303,795

26 Claims. (Cl. 260—449)

This invention deals generally, in a primary aspect, with processes and reactors for gasification of combustible carbonaceous raw materials such as powdered coal, coke, wood flour, etc., employing flame and high intensity sound waves in combination in a resonant reaction chamber. The invention contemplates, first, the burning of the raw material to produce carbon monoxide; second, injection of water to additionally produce hydrogen; third, adjustment of the carbon monoxide-hydrogen ratio to produce a "synthesis" gas suitable for catalytic hydrogenation or other process for synthetic production of hydrocarbons; and fourth, reacting the synthesis gases by catalytic hydrogenation or other process to furnish a yield of various hydrocarbon products such as paraffins, isoparaffins, olefins, aromatics, etc. The invention is not, however, restricted to burning of powdered raw materials, but has application to other reactions, as, for example, to production of synthesis gases by reaction of methane with steam.

It is contemplated that the invention may be practiced as a whole, or may be used merely as an efficient and effective burner and reaction accelerator for producing carbon monoxide, or carbon monoxide and hydrogen, from the raw material. Or the invention may be utilized to produce hydrogen-carbon monoxide adjusted synthesis gases, which may then be employed in a conventional "Synthine" plant, or otherwise as desired.

The present invention employs a reaction chamber which, in the apparatus aspect, is preferably in the nature of a sonic resonant burner of the general type first disclosed in my prior application Serial No. 439,926, filed April 21, 1942, entitled Method and Apparatus for Generating a Controlled Thrust, and now abandoned, also in my Patent No. 2,480,626, filed as a continuation-in-part of Serial No. 439,926. In those cases, however, the uses principally in view were in the fields of jet propulsion and gas compression. The reaction chamber preferably used for present purposes is of a half-wave U-tube type first disclosed in my said application Serial No. 439,926, again disclosed in my Patent No. 2,546,966, filed as a continuation-in-part of Serial No. 439,926, and again disclosed in my co-pending application entitled Acoustic Jet Engine With Centrifugal Fluid Pumping Characteristics, filed April 24, 1950, Serial No. 157,740, of which the present application is a continuation-in-part.

Speaking broadly and somewhat generally, a sonic burner of the type herein referred to comprises a resonant gas chamber, typically a conduit, having a combustion chamber region within which a suitable fuel is periodically burned. The gas chamber or conduit is designed so that an acoustic standing wave can be set up therein by intermittent combustion taking place in the combustion chamber region at a resonant frequency of the confined gas body or column. In a simple form, the conduit may be closed at one end, and open at the other, the closed end portion forming the combustion chamber. Such a device, when excited by intermittent pressure pulses produced by intermittent combustion of fuel in the closed end of the conduit, behaves acoustically like a quarter-wave organ pipe, and if the intermittent pressure pulses occur at the resonant frequency of the conduit (considered as a quarter-wave organ pipe), a standing wave is established, with a pressure antinode in the closed end of the conduit, and a velocity antinode at the open end. The pressure antinode of the standing wave periodically compresses the fuel-air mixture sufficiently for efficient combustion.

While the fuels heretofore used in such burners have been liquid or gaseous hydrocarbons, I have discovered a process for burning powdered coal, using such a sonic burner, and have found that by properly fluidizing and feeding the powdered coal, with proper control of air, so as to have a rich mixture, the coal can be burned, in a deficiency of air (so as to yield carbon monoxide), with unprecedented speed and violence, giving a through-put rate a number of times higher than with any previously known burner.

The preferred form of burner and reactor has a combustion gas conduit in the general form of a U-tube, the ends of which are preferably connected by a curved feed pipe. Means are provided for feeding charges of fuel and air to a combustion zone or zones located in one end or both ends of the U-tube, and for initiating ignition of such fuel charges at the combustion zone or zones. There is a gas discharge outlet midway of the length of the U-tube, and there may be an air inlet midway of the length of the feed pipe. The U-tube may be regarded as a half-wave length pipe for a fundamental wave frequency, and fuel is exploded in the combustion chamber at that frequency. A half-wave length standing wave appears in the hot gases in the U-tube, with pressure antinodes at the two ends, and a velocity antinode at the mid-point, adjacent the gas discharge outlet. The complete feed pipe is preferably made a half-wave long, taking into account the lower temperature at which it operates, so that this pipe is actually somewhat shorter than the U-tube. Air may be fed into the intake opening into the feed pipe without use of valves, according to principles set forth in my prior application entitled Standing Wave Jet Propulsion Apparatus, filed February 15, 1947, Serial No. 728,766, now abandoned.

Such an apparatus is a very efficient and effective burner, and can be employed to burn petroleum fuel and air mixtures, fluidized powdered coal, or other powdered combustible carbonaceous materials. Being a closed system, it does not lose energy like a quarter-wave length open-ended sonic burner, nor does it produce the objectionable noise of the latter.

Using a rich fuel mixture in such a burner, combustion products rich in carbon monoxide are obtained, and this carbon monoxide can be collected and employed in making synthesis gas products by known procedures.

The burner apparatus is also equipped, however, with means for introducing certain reagents to various points along the resonant U-tube, or even into the feed pipe, for producing various synthetic petroleum products under the influence of the periodic flame and the vibratory pressure and velocity conditions created within the U-tube. For example, introduction of steam results in the production of water gas containing hydrogen and carbon monoxide, and use of a catalyst within a subsequent stage results in hydrogenation of the carbon monoxide, and immediate yield of hydrocarbon products.

The intermittent flame produced in such a sonic burner is very violent, and is propagated with extreme velocity. The flame is generated at the pressure antinode, and extends a substantial distance down the combustion tube, but generally not to the velocity antinode, where the pressure is reduced to mean pressure, and cooling air may, under some conditions, have been admitted. This flame is literally turned on and off by the sound wave, at the resonant frequency of the apparatus. These sonic conditions, under which successive fuel mixture charges are compressed at the resonant frequency of the apparatus, and are violently burned during the compression phases of successive sound wave cycles, are found to increase very materially the rate of flame propagation, and the effectiveness of fuel consumption. The conditions are unusually well adapted for the effective burning of an exceedingly rich fuel mixture, giving an unusually high output of carbon monoxide. Such a burner is also found in practice to have an unexpectedly high through-put rate with fluidized powdered coal. In tests which I have made, 400 pounds of powdered coal have been burned per hour per cubic foot of burner volume. Insofar as I am advised, this through-put is many times the best that has previously been realized with powdered coal.

One major object and corresponding accomplishment of the invention is accordingly the provision of a novel process and apparatus for burning powdered coal, coke, and the like, to give an exceedingly high through-put rate, and to furnish combustion gases rich in carbon monoxide.

A further object is provision of a sonic burner process and apparatus within which a reaction of the general nature $C+H_2O \rightarrow CO+H_2$ may be carried out, and to this end, the invention provides for introduction to the burner of water, preferably in the form of steam, or steam and air, or steam and oxygen. The desired reaction is promoted and facilitated by the violent, sonically driven flame, and by the high pressure and velocity oscillations within the reactor.

A still further object and accomplishment is adjustment or improvement of the hydrogen to carbon monoxide ratio in the output gases, so as to yield directly a "synthesis" gas adjusted to the requirements of a process for production of desired synthetic hydrocarbons, for example, the "Synthine" catalytic hydrogenation process. This I may accomplish in either of several ways. By use within the sonic reactor of suitable catalysts (well known in the art), the water-gas-shift reaction, $CO+H_2O \rightarrow CO_2+H_2$, will occur, and the proportion of hydrogen thus increased. An alternative is to introduce coke oven gas into the sonic burner, which, as is well known, can be converted with steam into hydrogen and carbon monoxide. The hydrogen in this converted coke oven gas is sufficiently rich to make possible the necessary balance in resulting mixture. These reactions are all aided by the action of the high intensity sound waves.

Finally, it is a still further object of the invention to react the synthesis gases by catalytic hydrogenation, or some related process, within a final stage of my sonic reactor, to yield synthetic hydrocarbon products of various kinds, depending upon such variable conditions as ratio of hydrogen to carbon monoxide, pressure, temperature and catalyst.

Before proceeding to a detailed description of the sonic reactors of the invention, a brief discussion will be given of typical reactions capable of being carried out therein.

First, and simplest, is the burning of fuel, typically fluidized powdered coal, with restricted air supply, to furnish carbon monoxide, according to the reaction:

$$2C+O_2 \rightarrow 2CO \quad (1)$$

The violent flame, fluctuating at sonic frequency, and high intensity pressure cycle, furnishes near ideal conditions for burning rich mixtures of powdered coal to yield carbon monoxide.

Second, by injecting water (usually steam) to the combustion region, carbon particles heated by the flame react with the water, and a mixture of carbon monoxide and hydrogen is obtained according to the usual water-gas reaction:

$$C+H_2O \rightarrow CO+H_2 \quad (2)$$

Also occurring under these conditions, depending upon the oxygen and water admitted, is the reaction:

$$4C+O_2+2H_2O \rightarrow 4CO+2H_2 \quad (3)$$

By subsequent (downstream) introduction of water, and the use of a suitable catalyst, the hydrogen-carbon monoxide ratio may be increased according to the water-gas-shift reaction:

$$CO+H_2O \rightarrow CO_2+H_2 \quad (4)$$

It will be seen that by manipulating the conditions within the sonic reactor, different ratios of hydrogen to oxygen may be obtained in the yield. The ratio may be further modified by introduction of hydrogen or carbon monoxide from a separate source. For example, coke oven gas may be introduced, and can be converted, with steam, into hydrogen and carbon monoxide, with high ratio of hydrogen to carbon monoxide.

Thus the process, in this respect, contemplates the production of hydrogen and carbon monoxide mixtures of various H—CO ratios, for various uses.

To produce synthetic hydrocarbon products, by a process in the nature of the "Synthine" process, a hydrogen and carbon monoxide mixture obtained as above is subjected to catalytic hydrogenation. The exact reaction or reactions which occur in the Synthine process depend upon variable conditions, including hydrogen-carbon monoxide ratio, catalyst used, mean static pressure, temperature, and influence of the sound wave maintained in the reactor. For example, with a high ratio of hydrogen to carbon monoxide, and a catalyst of high hydrogenating power, the reaction is believed to be predominantly of the type:

$$nCO+(2n+1)H_2 \rightarrow C_nH_{2n+2}+nH_2O \quad (5)$$

With a lower ratio of hydrogen to carbon monoxide, and a catalyst of lesser hydrogenating power, the reaction is believed to be predominantly of the type:

$$nCO+2nH_2 \rightarrow C_nH_{2n}+nH_2O \quad (6)$$

The above reactions (both of which are likely to occur to varying degrees) are favored by cobalt or nickel catalysts. With an iron catalyst, and a still lower ratio of hydrogen to carbon monoxide, the reaction is believed to be of the type:

$$2nCO+nH_2 \rightarrow C_nH_{2n}+nCO_2 \quad (7)$$

Thus the unsaturated hydrocarbons are promoted by the lower H—CO ratios. It will be explained hereinafter how these reactions may be obtained within my sonic reactors.

Reference is now directed to the drawings, showing diagrammatically certain illustrative forms of sonic reactors embodying the invention, and wherein.

Figure 1:
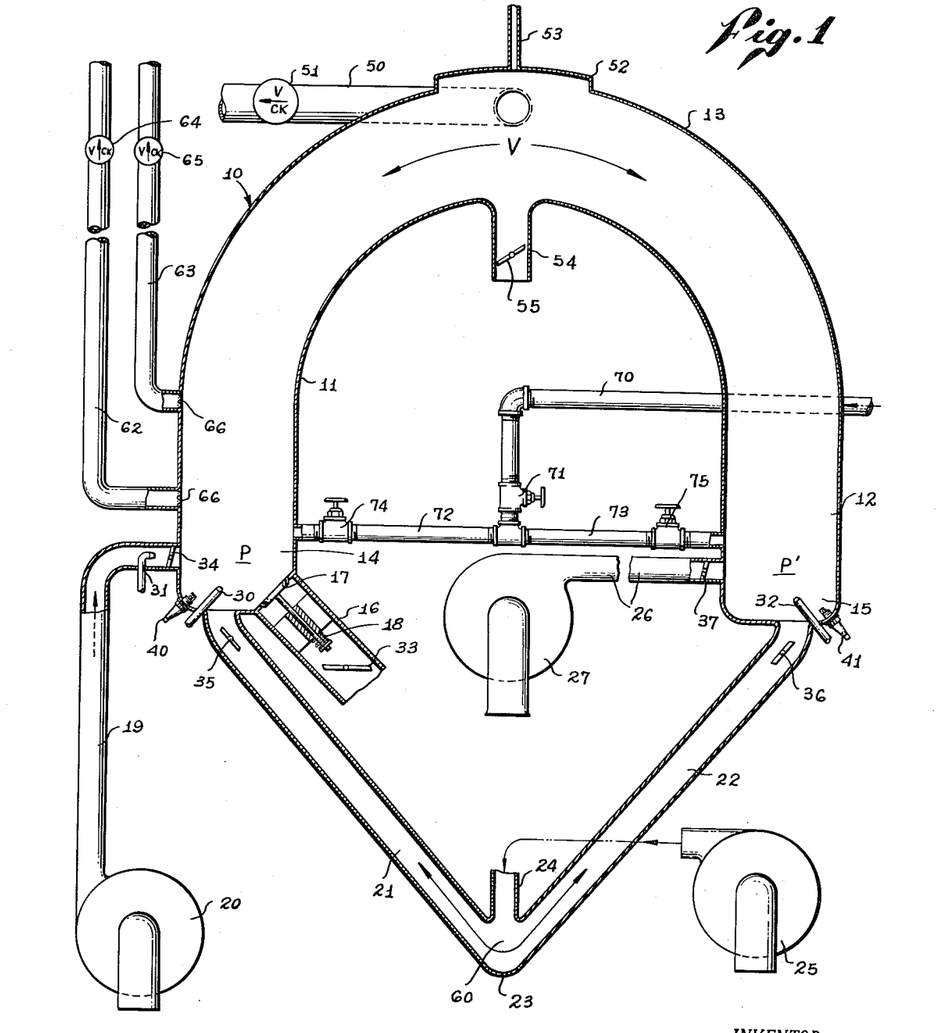
Figure 1 is a schematic illustration of one half-wave U-tube form of sonic reactor in accordance with the invention.

The sonic reactor of Figure 1 comprises a sonic pipe 10, preferably in the general form of a U-tube, having legs 11 and 12 connected by a curved pipe segment 13. As for the scale of the apparatus, the pipe 10 may be only a few inches in diameter, or easily up to one or two feet, or even larger. It may here be mentioned that the U-tube form of pipe gives compactness, brings the ends into proximity so that a desirable type of air feed pipe can be used, and gives certain later described pumping effects because of centrifugal forces developed in the travel of the gases around the curved portion of the U-tube. By giving up these advantages, the pipe may be made straight. The ends of the two legs 11 and 12 of the pipe 10 are closed, excepting for certain pipe openings to be presently described. The closed end region of leg 11 forms a combustion chamber 14 wherein the mixture of air and carbonaceous raw material is periodically burned. The closed end region of leg 12 may optionally be employed as a combustion chamber 15 within which mixtures of the raw material and air may be periodically burned, although the system will operate with combustion occurring only within the leg 11, as will later appear. Air for combustion may be introduced into combustion chamber 14 in various ways, several of which are shown in Figure 1, and it will be understood that these may be used alternatively, or in combination. For example, air may be taken through a short air intake pipe 16, controlled by a poppet valve 17, caused to open in opposition to a closing spring 18 by reason of pressure depression developed inside the combustion chamber.

A second example, particularly useful with elevated mean static pressure within the U-tube, comprises an air induction pipe 19 of high acoustic impedance, e. g., quarter-wave length, and a blower 20 may be used in connection with this pipe 18. The matter of high acoustic impedance and quarter-wave length will be explained hereinafter. Air also may be introduced through a pipe 21, which forms, together with a pipe 22 opening similarly into the end of U-tube leg 12, a relatively sharp curve or angle 23. Each pipe 21 and 22 is designed to have high acoustic impedance, or of quarter-wave length, as explained hereinafter. Opening into the sharp angle or V 23 formed at the juncture of pipes 21 and 22 is an air intake opening or port 24, and air may be drawn into the system through this port from the atmosphere or may optionally be blown in by means of blower 25, the latter being useful when it is desired, or found beneficial, to operate at an elevated mean static pressure. Assuming the region 15 of U-tube leg 12 is to be used as a second combustion chamber, a high impedance or quarter-wave length pipe 26 is shown as opening into the chamber 15, and a blower 27 furnishes air to pipe 26. This may be an alternative for the feed pipe 22, or may be used with pipe 22.

Fuel is introduced to chamber 14 as by means of fuel injection nozzle conventionally indicated at 30, either continuously, or under control of a motor driven valve, synchronized with sound wave in the pipe 10, as shown in connection with a later described form of the invention (see Figure 3). An alternate fuel injection nozzle is indicated at 31, inside the air induction pipe 19. Assuming chamber 15 in leg 12 to be employed for combustion, a fuel injection nozzle is diagrammatically indicated at 32. For control, or complete cut-off of the air flow into the system through pipes 16, 19, 21, 22, and 26, said pipes are herein shown as furnished with butterfly valves 33 to 37, inclusive. The fuel mixture introduced to the combustion chamber 14 is ignited by means of a spark plug 40, and a spark plug 41 may be employed in connection with the chamber 15, if the latter is to serve as a combustion chamber. These spark plugs are ordinarily required only to initiate combustion, after which the process proceeds automatically. If it be desired, however, that the spark plugs continue to operate, suitable timed ignition systems, to be indicated later, will be provided.

The fuel to be fed to the system is typically powdered coal, which is fluidized with air and fed through a pipe and through suitable injection nozzles. Briefly, the fluidizing step consists in circulating a stream of air through a body of the powdered coal. The air picks up the coal, forming a sort of lubricating film on each coal particle, and the coal flows like fluid, and can be circulated through pipes and valves and discharged through an injector nozzle. In the present system, such fuel may be fed intermittently, or continuously, as already mentioned. If fed intermittently, suitable control valves may be employed as known in the art, or as explained in my aforementioned patents and patent applications, or as set forth hereinafter.

The sonic U-tube 10 has a discharge pipe 50 leading from approximately its mid-point, i. e., within the region 13, and as here shown, the connection is made to one side of the pipe section 13. In the event that it should be desired to operate with an elevated means static pressure within the pipe 10, the discharge pipe 50 may contain a spring-loaded check valve 51. The pipe 10 has, within the area of the curved section 13, and on the "outside" curve of the latter, an ash trap 52, equipped with a discharge pipe 53. On the "inside" curve of the pipe section 13 is an air intake pipe 54, preferably equipped with a throttle valve 55. Operation will be described, first, assuming use of air intake pipe 16 containing poppet valve 17, the valves 34, 35, 36 and 37 being assumed as closed, or else the pipes 19, 21, 22, and 26 being assumed as omitted. Combustion is to occur only in chamber 14, and fuel is to be introduced through nozzle 30.

Assuming now that a charge of fuel, e. g., fluidized powdered coal, mixed with an initial igniting additive such as methane, has been discharged into chamber 14, energization of spark plug 40 results in an explosion within the chamber 14. This explosion creates a strong positive pressure pulse in the combustion chamber gases, which travels through the gases as a wave of compression, moving with the speed of sound, along the leg 11, around the semi-circular section 13 and through leg 12 to the closed end of the latter, building up a pressure peak at this point. The wave of compression is reflected by the closed end of leg 12 and returned in reverse direction, re-traversing leg 12, section 13, and leg 11, to return to the point of origin, namely, the combustion chamber 14, so as to recreate a pressure peak at that point. The pressure in chamber 14 undergoes a resonant frequency pressure cycle, and on the negative half-cycle, the pressure depression opens the valve 17 to admit an air charge. The maximum negative pressure swing occurs just as the wave of compression started at 14 reaches the opposite end of the U-tube. Also during this negative pressure half-cycle a further fuel charge is fed through nozzle 30. These subsequent charges do not need an igniting additive. The fuel and air so introduced to the chamber 14 are compressed by the previously described returning wave of compression, and as this pressure wave reaches its maximum in the chamber 14, a second explosion occurs, either by a second timed energization of spark plug 40, or by a lingering "tail flame" retained in the chamber 14 between successive explosions. Thus a second explosion takes place, and the cycle is thereafter continuously repeated.

The described wave of compression traveling around the pipe 10 with the speed of sound in the hot gases contained therein is, in fact, a sound wave, and the pipe 10 behaves as a half-wave length sonic pipe. The chamber 14 at the end of the leg 11, and also the region 15 at the end of the leg 12, experience pressure cycles (alternating positive and negative half-cycles with reference to a mean pressure), and are the locations of pressure antinodes of a half-wave length sonic standing wave established within the pipe 10. Midway between these pressure antinodes (zones of maximum fluid pressure variation), within the curved pipe section 13, is a velocity antinode of this standing wave. In other words, this region is one of maximum fluid velocity variation, the gas particles traveling at high velocity first in one direction and then in the other, changing direction at the frequency of the standing wave. It should be seen that the frequency of this standing wave depends upon the length of the pipe 10 and on the temperature of the gases contained therewithin. The pipe 10 may be regarded as a half-wave length resonant sonic pipe, having a natural resonant frequency at which the described cyclic pressure and velocity oscillations occur within the hot gas column inside the pipe 10.

Thus, briefly summarizing, a standing sound wave is established within the pipe 10, with pressure antinodes P and P' at regions 14 and 15, and a velocity antinode V at the mid-point of the U-tube. Upon the occurrence of each pressure peak at the region 14, combustion of a charge of introduced fuel and air takes place, and it will be seen that this combustion is thus automatically timed to occur at the resonant frequency of the system. The standing wave compresses the fuel charge for combustion, and also operates the air intake valve 17. The explosion, taking place at the instant of the positive pressure peak within the region 14, builds up the pressure peak still higher, and maintains the standing wave at high amplitude.

Figures 2, 5, 6:
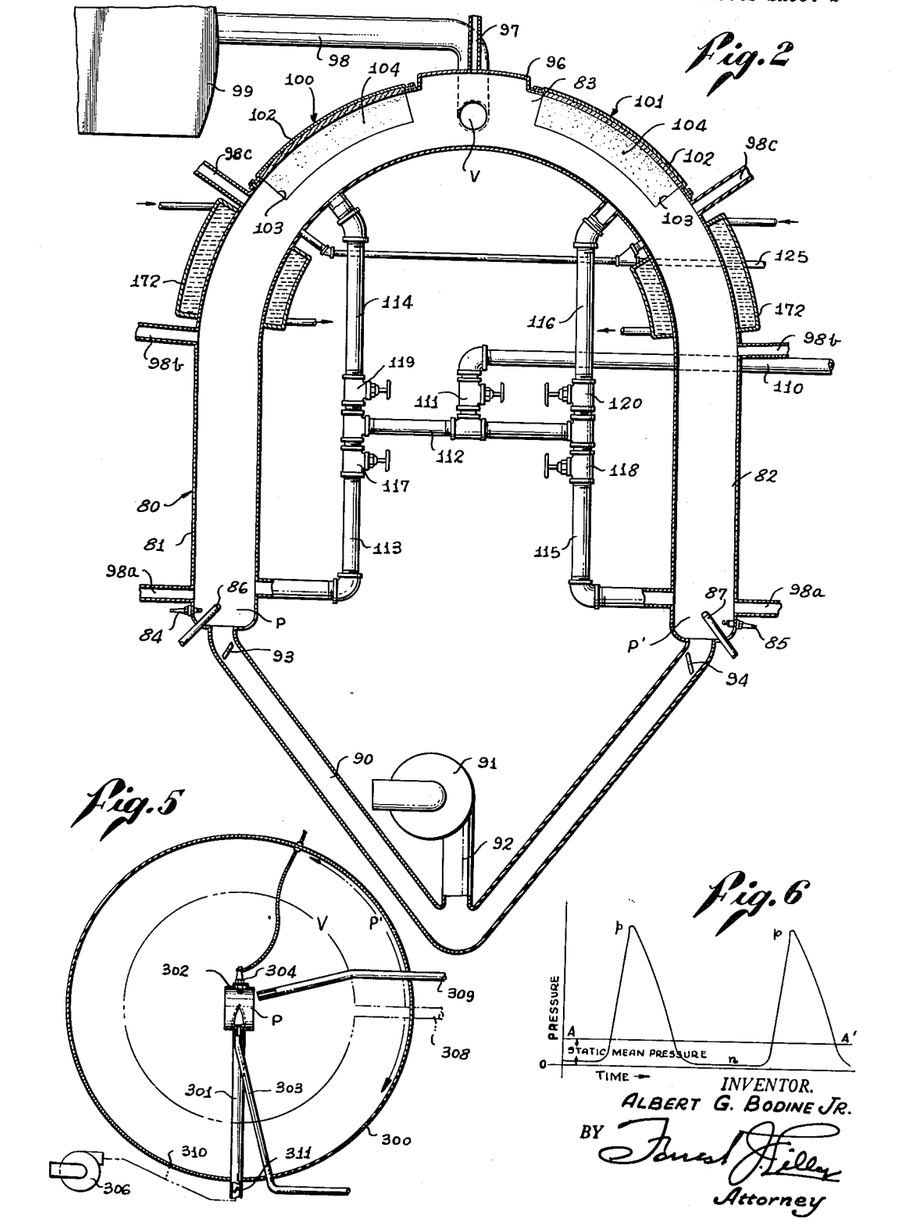
Figure 2 shows a modification of Figure 1.
Figure 5 is a schematic illustration of a spherical sonic reactor for carrying the invention into effect.
Figure 6 is a diagram of a typical pressure cycle at the pressure antinode region of one of my sonic reactors.

Figure 6 is a diagram of a typical pressure cycle at the pressure antinode (combustion chamber) region. The line A—A' represents the level of mean pressure within the U-tube, and this pressure may be atmospheric, or a number of atmospheres, depending upon immediate requirements. The positive pressure half-cycles p are tall and peaked, while the negative pressure half-cycles (negative relative to mean pressure) are flattened and of much lower amplitude than the positive peaks. With a mean pressure equal to one atmosphere, the negative half-cycles are available to operate the air intake valves; with elevated mean pressure, blowers are required for intake air, and the valveless high impedance intake pipes are best suited. With atmospheric mean pressure, the positive pressure peaks can approach three atmospheres; with a mean pressure of 100 pounds per square inch, the positive pressure peaks can approach 300 pounds per square inch.

As heretofore stated, the spark plug 40 may be used only at the start of operation, but if used to assure ignition under running conditions, its energization may be timed to synchronize with the standing wave. This may be accomplished by means such as described in my issued Patent No. 2,546,966, or by means indicated in my aforementioned co-pending application Serial No. 157,740. Similarly, the fuel may be fed to the nozzle 30 continuously, or intermittently, in synchronous relation with the standing wave, as, for example, by means indicated in the patent and application identified immediately above.

Gases are continuously pumped through the system, from the air intake, in this instance the air intake pipe 16 and valve 17, through the leg 11 to the curved pipe section 13, and out by way of the discharge pipe 50. This progression of gases occurs continuously, at much lower velocity than that of the sound wave traversing the U-tube. However, while the gases thus flowing through the system do so at relatively low velocity, as compared with the velocity of the sound wave, it is to be understood that the gas particles in the region V oscillate around the pipe section 13 at high velocity, this being a region of the standing wave wherein maximum gas particle velocity is achieved. The high velocity gas particles thus flowing in section 13 of the pipe develop centrifugal force effects which create a region of increased pressure adjacent the outside curve of the pipe, and a region of lowered pressure in a region of the inside curve of the pipe. Thus it will be seen that the pipe 54, opening into pipe section 13 on the inside curve of the latter, finds a sub-atmospheric pressure region, causing suction of air into the section 13 of the U-tube. Of course, if the apparatus is operated at high mean static pressure, this sub-atmospheric pressure condition will not be developed. Air so introduced may in some cases be useful for cooling purposes, also to complete combustion in the downstream region of the sonic pipe.

The centrifugal force effects described in the preceding paragraph throw any relatively dense materials outward into the trap 52, whence they may be discharged via pipe 53. Any ash or solid foreign matter contained within the gas column will thus be separated out. The discharge pipe 50 is connected into one lateral side of the pipe section 13, where the discharge pressure is ample. It will be understood of course that this discharge pressure, at the velocity antinode region, is substantially constant. If it be desired to operate the system at an elevated mean static pressure, the spring-loaded check valve 51 may be employed, and will hold a back pressure on the system, causing an elevated mean static pressure within the system, provided air be introduced into the system under initial pressure.

In the operation of such a system, the flame developed in the combustion chamber 14 is found to have an exceedingly violent character, and to be propagated at an extremely high rate of speed. This is apparently owing in large part to the presence of the standing sound wave, which not only provides a high compression for combustion, but apparently in some way, not entirely understood as yet, excites the flame to unusual and unexpected intensity and speed of propagation. The flame may extend well around the leg 11 and the curved pipe segment 13. It may be somewhat controlled, or shortened, by the optional air induction into port 54, which both completes the combustion at the tip of the flame, and cools the gas column downstream of the flame tip.

Consider next the alternate use of the high impedance or quarter-wave length air induction pipe 19, it being assumed that the valve 33 in pipe 16 is closed, or that the pipe 16 and valve 17 have been entirely omitted. Let it further be assumed that in this case the region 15 and the closed end of the leg 12 is also to function as a combustion chamber, and that the high impedance or quarter-wave length air induction pipe 26, together with blower 27, are to be employed for air supply to the region 15. It should here be explained that an open port for air induction into the pressure antinode zones P and P' of the sonic pipe would destroy the standing wave. However, valveless pipes, such as 19 and 26, may be employed for this purpose provided they have the length necessary to provide high acoustic impedance at their juncture with the pipe 10. This requirement is satisfied if the air induction pipes have a quarter-wave length for the frequency of operation of the sonic pipe 10. An intake pipe of high acoustic impedance (a somewhat broader concept) is one whose impedance (ratio of pressure amplitude to gas particle velocity) is substantially as high as the acoustic impedance of the region of the sonic pipe (U-tube) into which it is connected. For a complete disclosure of such high impedance valveless air induction pipes, see my aforementioned pending application Serial No. 728,766. The blowers 20 and 27 used in connection with the quarter-wave length induction pipes 19 and 26 assure delivery of a proper quantity of air, and this can be controlled by blower speed or by means of throttle valves 34 and 37.

The third air induction system, constituted by the pipes 21 and 22, will next be considered. The pipes 21 and 22 are each of quarter-wave length for the resonant frequency of the sonic U-tube 10, taking into account the colder temperatures prevailing within the air induction pipes. Accordingly, the juncture of the pipes 21 and 22 becomes the location of a velocity antinode, and air within the pipe system 21—22 oscillates at high velocity around the turn of the angular juncture of the two pipes. Centrifugal force effects result in a pressure depression at the "inside" turn of the juncture or, in other words, at the point 60. This pressure depression enables atmospheric air to be drawn into the induction pipe system 21—22 without the necessity of blowers. In addition to the centrifugal force effect, the Bernoulli effect of the high velocity gases oscillating past the juncture of the pipes 21 and 22 creates a pressure depression sufficient to suck atmospheric air into the system. If higher air induction pressure is desired, a blower 25 may be connected to the port 24 as indicated.

With use of either the air induction pipes 19 and 26, or the interconnected system 21—22, a controlled quantity of air (regulated, for example, by means of the throttle valves associated with the several pipes) is discharged to each of the combustion chamber regions 14 and 15. As explained earlier, an explosion occurring in one of the combustion chambers, for instance, in chamber 14, develops a positive pressure pulse which travels around the U-tube with the speed of sound, and this pressure pulse builds up a pressure peak in the chamber 15 at the other end of the U-tube one-half cycle following the initial explosion. If, in the meantime, a charge of fuel has been introduced to chamber 15, for instance, through nozzle 32, and spark plug 41 is energized coincidently with this pressure peak at 15, an explosion takes place, which augments the pressure peak. The augmented pressure peak then starts a wave of compression back around the U-tube in the reverse direction. Thus, the returning wave is not merely a reflected wave, but has been amplified by the timed explosion at 15. It should now be seen that explosions may be timed to take place alternatively in combustion chambers 14 and 15, with 180° phase difference, and by this means the amplitude of the standing wave in the system is doubled. As before, the fuel may be fed through nozzle 32 into chamber 15 continuously, or under a synchronous control. My aforementioned prior Patent No. 2,546,966 and also my aforementioned application Serial No. 157,740 disclose suitable means for synchronous timing of the fuel feeding means and spark plugs to operate in synchronism with the resonant standing wave in the sonic pipe 10. And of course, as before stated, it is found in practice that it is ordinarily only necessary to employ the spark plugs at the start of operations, since once the standing wave has been established, the compression of the fuel at the pressure antinodes P and P' is sufficient that a remnant of the original flame ordinarily still lingering in the area of the combustion chamber can be relied upon to set off subsequent explosions at times of positive peak pressure. The system, designed in accordance with the teaching herein, tends to be automatically regenerative.

The process for producing carbon monoxide gas, using the equipment of Figure 1, is as follows: fluidized powdered coal, or other fluidized carbonaceous, combustible raw material, is introduced to the combustion chamber or chambers of the sonic reactor of Figure 1, and is cyclically burned therein at the resonant frequency of the sonic pipe 10. As stated hereinabove, the combustion in such an apparatus is violent in nature and the flame is propagated at extremely high velocity. The combustion appears to be accelerated and increased in intensity under the influence of the pressure cycle of the sonic standing wave. Under these conditions, it is found that a very "rich" mixture of fuel and air can be satisfactorily burned. In other words, the powdered coal is burned in a deficiency of air (controlled, for example, by the setting of the throttle in the air intake pipe), so as to promote the production of carbon monoxide according to Equation 1 set forth hereinabove, and to minimize production of carbon dioxide. If too much air is supplied, carbon dioxide instead of carbon monoxide is of course produced. The air supply is therefore restricted to give a mixture sufficiently rich to produce predominantly carbon monoxide, and in practice this is a matter of experimentation with any given apparatus. In some cases the air used to fluidize the powdered fuel may be made sufficient to satisfy the needs of combustion. By reason of the violent flame characteristics, fluctuating at sonic frequency, and the high intensity pressure cycle, a large quantity of powdered coal can be burned per cycle in a rich mixture to give the desired carbon monoxide. The "through-put" is, in fact, a number of times larger per cubic foot of burner volume than with any previously known burner equipment. This rapid "through-put" results in short residence time for the fuel particles in the various regions of the reactor, thus making it possible to accomplish to a greater degree those reactions which are aided by early arresting of the completion of chain reaction steps.

The carbon monoxide gas formed by combustion of the powdered coal in the combustion chambers 14 and 15 travels around the legs 11 and 12 toward the intermediate section 13 of the U-tube, and is taken off by way of pipe 50. It is sometimes advantageous in practice to admit air at 54 to cool the outgoing gases, and such air may also further the combustion of any fuel particles which remain unburned after having traveled fairly well down the lengths of the two legs 11 and 12 of the U-tube.

The higher the mean static pressure maintained within the apparatus, the higher is the effectiveness of the process; and to permit operation at an elevated mean static pressure, the air is introduced to the system under blower pressure, and a back pressure valve, such as spring-loaded check valve 51, is employed in the discharge pipe. In such case, the valve 55 is maintained closed, or the air intake 54 omitted entirely; alternatively, air may be introduced through intake 54 under blower pressure.

The leg 11 of the U-tube is also shown as optionally provided with a multiplicity of outlet pipes 62 and 63, connecting into leg 11 at different distances from the end closure of said leg. These pipes may have quarter-wave length, or high acoustic impedance, as explained elsewhere herein, and they may be equipped at their far ends with check valves 64 and 65. More than two of such pipes may be employed, if desired. In the event that, with any given burner, fuel, or condition of burning, carbon monoxide in good concentration can be obtained in the head end regions of the leg 11, but greater proportions of $CO_2$ are obtained as the combustion proceeds down the leg 11, these pipes permit take off of the carbon monoxide in the regions of higher concentration. Fire screens such as indicated at 66 serve to stop the flame from following into the pipe 62, etc.

By injection of water, preferably in the form of steam, into the combustion chamber or chambers of the reactor of Figure 1, carbon particles heated by the flame react directly with the water, and I obtain a direct yield of carbon monoxide and hydrogen, according to Reaction 2 as given hereinabove. For this purpose a steam supply pipe 70, containing a control valve 71, feeds two branch pipes 72 and 73 discharging into legs 11 and 12, respectively, of the U-tube in the region of the combustion chambers 14 and 15. Control or shut-off valves 74 and 75 are placed in pipes 72 and 73, respectively. Reaction 3 also occurs under these circumstances, the heated carbon, oxygen and introduced water reacting to produce carbon monoxide and hydrogen.

These yields of carbon monoxide and hydrogen are drawn off by the discharge line 50, or by the lines 62, 63, etc., to be utilized, with or without adjustment of the ratio of hydrogen to carbon monoxide, for any purpose. Such gases are fitted for making synthetic hydrocarbon products, and may be purified, adjusted in the ratio of hydrogen to carbon monoxide, and then treated according to any conventional or desired process.

Other or additional "chain" or subsequent stage reactions may be accomplished within such a sonic reactor as is described hereinabove. Thus, carbon monoxide and hydrogen may be produced in one or both legs of the U-tube, particularly in the closed end portions of the legs, and additional reactions may then be obtained within the U-tube in zones located "downstream" from the regions in which the first reaction is carried out. For example, by introducing a suitable catalyst to the sonic reactor pipe 10, together with additional steam, some of the carbon monoxide can be converted to carbon dioxide, together with additional hydrogen. Again, by use within the downstream regions of the reactor, of a suitable catalyst, catalytic hydrogenation of the gases may be accomplished and desirable synthetic hydrocarbons obtained directly. Illustrative apparatus for carrying out these additional phases of the invention are shown in Figures 2 and 3.

Reference is next directed to the embodiment of Figure 2, wherein I have shown a modified sonic reactor designed for carrying out a two-stage process including, first, the burning of carbonaceous fuel to produce carbon monoxide, or, with introduction of steam, to produce carbon monoxide and hydrogen; and second, a catalytic reaction, in the presence of steam, to convert a proportion of the carbon monoxide to hydrogen.

In Figure 2 numeral 80 designates generally a U-shaped sonic reactor tube having opposite legs 81 and 82 connected by a curved pipe segment 83. Spark plugs 84 and 85 are used near the closed ends of the legs 81 and 82, respectively, and fuel feeding nozzles 86 and 87 discharge into the combustion chambers formed in the closed ends of the legs 81 and 82, respectively. Air for combustion is fed through a curved pipe 90, opposite ends of which are connected into the closed end portions of legs 81 and 82, and a blower 91 feeds air, under pressure, through pipe 92 into the midpoint of the pipe 90. The length of the pipe 90 from each leg of the U-tube to the juncture with pipe 92 is preferably a quarter-wave length for the wave frequency maintained in the sonic reactor pipe 90. Control valves, such as 93 and 94, may be placed in the pipe 90 near its juncture with the legs 81 and 82.

The curved segment 83 of the U-tube may be formed, on its "outside" curve, with an ash trap 96, from which leads an ash discharge pipe 97. A gas discharge pipe 98 leads from the mid-point of semi-circular pipe section 83 at a point around the pipe a short distance from the ash trap 96, and this discharge pipe 98 may discharge to a storage tank 99.

Downstream from the combustion chambers in the closed ends of the legs 81 and 82 are positioned catalyzers generally designated by the numerals 100 and 101. The particular catalyst used is subject to variation, and a suitable catalyst will readily be selected by those skilled in the art. No attempt is here made to illustrate the catalyzer in more than a diagrammatic way, since suitable catalysts may be compounded and subsequently constructed and supported in numerous fashions. Therefore, I here show merely a supporting plate 102 adapted to be secured to the sonic pipe over an aperture 103, the plate 102 supporting on its inside surface a catalytic bed 104 of any suitable nature.

A steam supply line 110, controlled by a valve 111, connects to branch line 112, and opposite ends of the latter feed pairs of steam lines 113, 114 and 115, 116. The lines 113 and 115 are arranged to discharge steam into the combustion chamber spaces of legs 81 and 82, near the head ends of the latter, while the lines 114 and 116 discharge into the curved section 83 of the pipe 80 on opposite sides of the mid-point of the latter, generally in the regions of the catalyzers 100 and 101.

Control valves 117 and 118 are used in lines 113 and 115, respectively, and control valves 119 and 120 are used in lines 114 and 116, respectively. To provide a means for control of temperature in the region 83, water jackets 172 are preferably placed around the legs 81 and 82 at the juncture with the region 83. This permits temperature reduction from around 3000° F. In the combustion chamber to any desired level in the region of the catalysts.

The operation of the sonic reactor is in general the same as that of Figure 1, and only a brief description need here be given. Powdered or fluidized fuel is fed, either continuously or under timed control, into the combustion chambers in closed ends of legs 81 and 82. Air is introduced, under blower pressure, through pipe 90. In accordance with principles of operation already explained, explosions of the resulting mixtures take place alternately in the closed ends of the U-tube, establishing in the sonic pipe 80 a standing sound wave, one-half wave length long, with pressure antinodes P and P' in the closed ends of the legs 81 and 82, respectively, and a velocity antinode V at the mid-point of the U-tube.

The introduced coal, or other fuel, is accordingly periodically burned, at the frequency of the standing wave, in the legs 81 and 82, and the products of combustion are delivered by way of pipe 98 and discharged into storage tank 99. By feeding a rich fuel mixture, carbon monoxide is produced in large quantity.

To produce both carbon monoxide and hydrogen, steam is introduced into the combustion chambers through the lines 113 and 115, with the result that heated carbon particles react with the water to form carbon monoxide and hydrogen. Reactions 1, 2 and 3 are all carried out simultaneously under these conditions.

The reactor of Figure 2 is also designed to carry out, as a further step or phase, the Reaction 4 by which some of the carbon monoxide is converted to hydrogen, thereby improving the ratio of hydrogen to carbon monoxide in the produced gases. As is well known, this reaction requires a suitable catalyst. Such a catalyst is used at 100 and 101, and since suitable examples of appropriate catalysts are known in the art, no detailed description will here be given, beyond to note that the usual one consists of ferric oxide promoted by the oxides of chromium, calcium and mangesium. Other examples are well known in the art. The products of combustion and of reaction with steam thus progress along the legs 81 and 82 of the U-tube toward the outlet port leading to the discharge pipe 98, and when these products reach the region of the catalyzers 100 and 101 they are partially subject to the velocity cycle of the velocity antinode V. They are thus subject to some pressure fluctuation, and they also partake of a high velocity oscillatory movement longitudinally of the curved segment 83 of the pipe 80. The gases are thus scrubbed into intimate contact with the catalyst 104. This action is facilitated by reason of centrifugal force effects resulting from the gases being forced to move longitudinally around the curved pipe section 83, these centrifugal effects evidently crowding the gas toward the catalyzer.

A proportion of the carbon monoxide traversing the region occupied by the catalyzers 100 and 101 is accordingly converted to hydrogen and carbon dioxide. The products yielded by the several reactions are drawn off together by the pipe 98 and are conveyed to the storage tank 99. Also, or alternatively, a number of discharge pipes may be located at spaced intervals along the U-tube, as explained earlier, and as indicated at 98a, 98b, 98c, etc., with the result that it is possible to draw off a preponderance of a particular product near the region where it is formed. Temperatures within the U-tube may be controlled, particularly in the region of the catalyzers 100 and 101 and adjacent the discharge port leading to discharge line 98. This may be accomplished by the previously described water jackets. Alternatively, cold air, carbon monoxide, or other cooling fluid, may be introduced to the U-tube, under pressure, if desired, through branching line 125, and this cooling fluid may be relied upon to regulate the temperature of the gases in the region of the catalyzer 100 to establish a temperature level appropriate for the reaction desired.

Figures 3, 4:
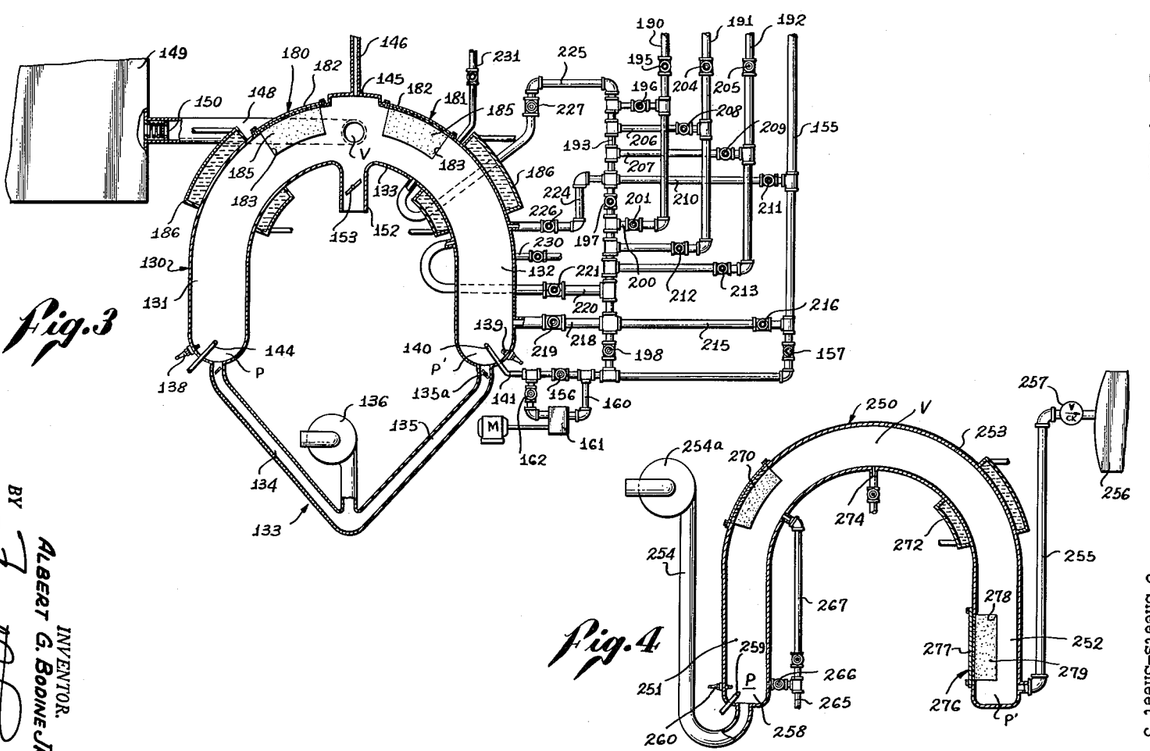
Figure 3 is a schematic illustration of another form of sonic half-wave U-tube reactor, having provision for additional reactions.
Figure 4 shows a modification of Figures 1–3.

Reference is now directed to Figure 3, showing one version of a complete system for converting combustible carbonaceous material, for example, fluidized coal, into synthesis gases, carbon monoxide and hydrogen, effecting a necessary or desirable adjustment of the ratio of hydrogen to carbon monoxide, and then effecting catalytic hydrogenation of the resulting gases to yield certain hydrocarbon products useful for many purposes, including the manufacture of gasoline. The sonic reactor is here shown to be of the same general U-tube type previously described. Thus there is a sonic U-tube 130, having opposite legs 131 and 132, connected by curved intermediate pipe segment 133. A curved air feed pipe 133, consisting of two quarterwave sections 134 and 135, connects into the closed ends of legs 131 and 132, respectively. A blower 136 introduces air under pressure into the pipe 133 at its mid-point. Combustion in the closed end portions of legs 131 and 132 is initiated by means of spark plugs 138 and 139, respectively. The powdered or fluidized carbonaceous raw material is introduced to the air pipe 135 through a nozzle 140 on the end of a supply pipe 141. This same fuel may also be introduced into the combustion chamber at the closed end of the other leg 131, but in this instance, to assure continuous and reliable high intensity combustion and standing wave maintenance, I prefer to burn, in the combustion chamber of the leg 131, a gaseous or liquid hydrocarbon fuel, such as low octane gasoline. Such auxiliary fuel is introduced to the leg 131 by means of a fuel nozzle 144.

The U-tube has an ash and spent catalyst trap 145, with a discharge pipe 146, and has, connected into its mid-point, a discharge pipe 148 leading to storage tank 149. A spring-loaded back pressure valve 150 may be used in the pipe 148, if it should be desired to operate the system at a mean static pressure above atmospheric. A pipe 152, for introduction of air, or carbon monoxide, connects into the U-tube at its mid-point, on its "inside" curve. This air or carbon monoxide may be supplied to pipe 152 under pressure, particularly if the system is operated at a high mean static pressure. The pipe 152 may be controlled by any suitable valve, such as is conventionally indicated at 153.

A fuel supply line for the fluidized raw material is indicated at 155, and this line is connected through valve 156 to the aforementioned pipe 141 leading directly to fuel nozzle 140. The line 155 may also include a control or shut-off valve 157. With valves 156 and 157 open, the raw material is fed directly through line 155 to pipe 141 and thence to the fuel nozzle 140. For metered or synchronous periodic feeding of the fuel, I may employ a by-pass line 160 around the valve 156. This line 160 includes a common type of periodic valve 161 driven by a motor M at a speed synchronous with the resonant frequency of the standing wave in the sonic pipe 130. The by-pass line 160 may also include control or shut-off valve 162. Thus, with valve 156 closed, and valve 162 open, fuel may be fed periodically, and the frequency of the intermittent fuel feed will be understood to be synchronized in any suitable way, with the natural resonant frequency of the pipe 130, such as by adjusting the motor speed until the operator hears a maximum of the small percentage of sound radiated from the walls of the reactor. The auxiliary fuel feed through nozzle 144 may be supplied continuously, or intermittently, using a periodic valve, motor driven at synchronous speed, it being understood that in any such case the fuel feeding intervals for the nozzles 140 and 144 should have 180° phase difference. The combustion of the fuel in the two legs of the U-tube, at the resonant frequency of the sonic pipe 130, and the establishment of a half-wave standing wave in the pipe 130, will be understood without further description, being the same in all essential respects as that heretofore given in connection with Figures 1 and 2. Briefly, the 180° opposed explosions in the two legs of the U-tube establish a standing sound wave, with pressure antinodes at P and P', and a velocity antinode at V. Combustion of the fuel mixtures introduced to the two legs of the U-tube creates and maintains this standing wave according to the principles heretofore explained. It has been found in actual tests that fluidized coal will very readily burn in such an apparatus as the present, but there may be some conditions, or some fuels, which will give more difficulty. Introduction of an excessive amount of steam may, for example, tend to quench the combustion within the leg 132, and the apparatus may thus occasionally misfire in the leg 132. Accordingly, in this case, I have made provision to assure regular combustion and maintenance of the standing wave by introducing an auxiliary hydrocarbon fuel such as gasoline into the one leg 131, and burning the raw material only in the other leg 132. Air for the combustion is introduced through the pipe sections 134 and 135, and final products of the reaction or reactions serially performed within the U-tube are drawn off through the pipe 148.

Catalyzers 180 and 181 are mounted in the U-tube 130, downstream from the point at which synthesis gases are produced and, in the present case, these are mounted in the curved U-tube segment 133. Only a more or less diagrammatic showing of catalyzers is here given, for the reason that suitable chemical and physical forms have widely varied characteristics, and are well understood by those skilled in the art. I here show, therefore, merely a supporting plate 182, mounted on the pipe section 133 over apertures 183, and having mounted on its inside surface a suitable catalytic bed structure 185 of the desired chemical composition. For regulation of the temperature inside the sonic reactor in the region of the catalyzers, I may either introduce cooling air by way of pipe 152, or utilize water jackets 186 surrounding the pipe 130 between the catalyzers and the combustion chambers. Temperatures in the combustion chambers of the apparatus, particularly at the pressure antinodes P and P', may be in the neighborhood of 3000° F. Because of particularly good heat transfer characteristics in an apparatus of this character, and the low specific heat of gases, I may easily reduce the temperature in the portion of the reaction chamber occupied by the catalyzers to a few hundred degrees Fahrenheit, or lower, if desired.

Provision is made for the introduction of various reagents into the sonic reactor at various points along the length of the same, as, for instance, hydrogen, carbon monoxide, steam (water), oxygen, or air, and catalysts in powdered form. Thus, I show a plurality of pipes 190, 191 and 192 for such reagents, and while the apparatus may be used in various ways, and the pipes used alternatively, or in various combinations, for different reagents, the pipe 190 is primarily for supply of hydrogen, or carbon monoxide, the pipe 191 for supply of water, preferably in the form of steam, and the pipe 192 for introduction of oxygen or air. A header 193 has at one end a pipe connection 194 to pipe 190, just outside shut-off valve 195, and connection 194 contains a shut-off valve 196. Somewhat farther along header 193 is a shut-off valve 197, and still further along is a shut-off valve 198. The header 193 connects, beyond valve 198, into fuel supply pipe 155. The pipe 190, used for supply of hydrogen, or carbon monoxide, has a connection 200, controlled by a valve 201, to the section of header 193 between valves 197 and 198. The steam and oxygen or air pipes 191 and 192 have shut-off or control valves 204 and 205, respectively, and beyond said valves, have connections 206 and 207, respectively, to header 193 between valve 197 and the aforementioned connection 194. The lines 206 and 207 have shut-off or control valves 208 and 209, respectively. The same section of header 193 is also connected, by line 210, having control or shut-off valve 211, to fuel supply pipe 155. Pipes 191 and 192 are also connected into header 193 at points between valves 197 and 198, and these connections are controlled by valves 212 and 213, respectively. Fuel supply line 155 is also connected to header 193, between valves 197 and 198, by a line 215, having valve 216.

The header 193 has a pipe connection 218, controlled by a valve 219, connected between its valves 197 and 198 and leading into the leg 132 of the sonic reactor, at a point in the region of the combustion chamber in the closed end of said leg, and has another connection 220, controlled by a valve 221, and connected between the same valves 197 and 198, opening into leg 132 further downstream, as indicated. Also connected to header 193, between valves 197 and 196, are pipes 224 and 225, the former connected into U-tube leg 132 at a somewhat downstream location, and the latter connected in at a still further downstream location, within the region of the semi-circular pipe section 181. The pipes 224 and 225 contain shut-off valves 226 and 227, respectively.

Fluidized catalyzers may also be introduced into the sonic reactor, and for this purpose I show catalyst supply pipes 230 and 231, the former connected into the leg 132 somewhat downstream from the combustion chamber regions where the fluid explosions are initiated, and the latter connected in still further downstream, in the general region of the catalyzer 181.

The reactor of Figure 3 is designed for carrying out a number of reactions of the nature heretofore indicated, either single or multiple stage.

Assume first that the reactor is to be used to carry out Reaction 1 to produce carbon monoxide from the fluidized, carbonaceous raw material. In this case, the valve 157 in fuel feed line 155 is open, valves 211, 216, 198 controlling outlets from the fuel feed line are closed, and the valves 195, 204, and 205 in reagent supply lines 190, 191 and 192, respectively, are closed. Assuming continuous fuel feed, valve 156 in fuel feed line 155 is open, and valve 162 in the by-pass through the metering valve 161 is closed. For periodic fuel feed, valve 156 is closed, and valve 162 opened. Valve 161 is then operated at the resonant frequency of the sonic U-tube 130. The remaining valves in the piping system should be closed. The fluidized carbonaceous raw material is thus fed into the combustion chamber in leg 132, and a suitable fuel is similarly fed through nozzle 144 into the other leg 131. The air supply is regulated, such as by adjusting the blower speed, to furnish a rich mixture of the fluidized powdered coal and air in the leg 132. With the reactor operated in this condition, and assuming, of course, synchronized resonant combustion cycles in the two legs 131 and 132, the carbonaceous raw material supplied to the leg 132 is converted to carbon monoxide. As stated earlier, the sonically controlled flame and the sonic pressure cycle in the leg 132 combine to effect very rapid combustion of the raw material, and a very high through-put rate is achieved. The products of combustion are of course withdrawn from the outlet pipe 148 and discharged to receiver 149.

Assume next that it is desired to produce a mixture of carbon monoxide and hydrogen. For this purpose steam is supplied to feed pipe 191, valves 204, 212 and 219 being opened, so that steam is introduced to the leg 132 of the sonic U-tube in the general region where combustion is taking place in the said leg 132. Conditions within the leg 132 of the U-tube reactor are susceptible to easy regulation for performance of Reaction 2 by which the heated carbon reacts with the introduced steam to give carbon monoxide and hydrogen. Thus, the air supply may be regulated by means of valve 135a in air feed pipe 135. The amount of steam introduced must of course not be so great as to quench combustion, and, on the other hand, must be sufficient to supply the needs of the reaction. This control is readily within the skill of the art. Alternatively steam is injected periodically, e. g., in rapidly occurring spurts. For such purpose a motor driven periodic valve can be substituted for the control valve 219, or can be used between the valve 219 and the leg 132. The products of the reaction are taken off, as before, by way of pipe 148.

If it should be desired to increase the ratio of hydrogen to carbon monoxide in the products of the last mentioned reaction, hydrogen from any suitable source is introduced into leg 132 by way of pipe 190, connection 194, header 193 and pipe 224, valves 196 and 226 being opened for this purpose. Alternatively, coke oven gas is introduced through the same pipe system, being thus introduced to the reactor through the pipe 224. In connection with this step, steam may be introduced to the reactor through pipe 220 by opening valve 221, and this steam is introduced in the general region to which the coke oven gas is being introduced. The coke oven gas is converted, in the presence of the introduced steam, to hydrogen and carbon monoxide, in accordance with a well known reaction. The resulting product is rich in hydrogen, and, upon mixture with the water gas produced in the earlier stage, gives a product of improved hydrogen-carbon monoxide balance.

Again, by use of a suitable catalyst, not shown, within the leg 132 of the reactor, for example, in the region thereof to which steam is introduced by the line 220, the Reaction 4 is carried out, with improvement of the hydrogen-carbon monoxide ratio. For this purpose, it is also possible to introduce the catalyst in powdered form through feed line 230. The usual conditions for this known reaction can readily be achieved within the reactor.

Synthesis gases, of adjusted hydrogen-oxygen ratio, are thus produced along the leg 132 of the sonic reactor. As heretofore indicated, these may be directly drawn off by way of discharge pipe 148, or may be subjected to catalytic hydrogenation, or other reaction, in a further reaction stage carried on in the U-tube, in this instance in the intermediate region 133 of the latter. For this purpose the catalyzers 180 and 181 are employed, and the reactor pressure and temperature are regulated to carry out the reaction desired. As stated earlier, the temperature in the combustion chambers of the U-tube is typically in the neighborhood of 3000° F., and by use of the heat exchangers 186 or by introduction of cold carbon monoxide, or air, as, for example, through pipe 152, or otherwise, the temperature in the region 133 of the U-tube occupied by the catalyzers 180 and 181 may be reduced to a few hundred degrees, depending upon the requirements of the process being carried out. The pressure prevailing in the section 133 of the U-tube is approximately constant, or fluctuates to only a relatively small degree, and can be held, by means of the back pressure valve, at any mean level from one to a large number of atmospheres, depending upon the reaction desired.

The gaseous products within the region 133 of the U-tube are subjected to high velocity oscillation owing to the velocity antinode V of the standing wave maintained in the U-tube, and they are therefore inconstant high velocity oscillation back and forth through the region occupied by the catalyzers. The catalyzers being preferably placed on the outside wall of the curved pipe section, the gases are caused, by centrifugal force effect, to be scrubbed into intimate contact therewith.

It is well known that the particular reaction or reactions obtainable in the catalytic hydrogenation of synthesis gases containing carbon monoxide and hydrogen depend upon the ratio of hydrogen to carbon monoxide, the nature of the catalyst employed, the temperature, and the pressure. The reactions will in general be in the nature of the Types 5, 6 and 7 given hereinabove. These reactions are promoted and accelerated in my process and apparatus because of the driving influence of the high intensity standing sound wave. The products of the last described reaction are taken off by way of pipe 148 and discharged to receiver 149.

The system of Figure 3, as described, has provision for many variational operations. For example, a controlled amount of steam can be fed through the injector 40 along with the fluidized coal by opening the valve 198 in header 193 (valves 212 and 204 being assumed to be opened). Oxygen, or air, can be introduced to the reactor through feed line 192, valve 213 and pipe 218, and such introduction aids the control of combustion.

Oxygen introduced through valve 209, pipe 207, header 193, pipe 225 and valve 227, modifies the reaction to yield oxygenated products.

In the event that Reaction 4 is to be carried out within the region 133 of the U-tube, steam may be introduced by way of line 191, pipe 206, and pipe 225. In such case, the catalyzer 181 will of course be of the type necessary for the reaction in question.

Figure 4 shows another embodiment of sonic reactor for producing synthetic hydrocarbon products from raw material, such as fluidized powdered coal. Again, a U-tube type of sonic resonant reactor is employed, being designated generally by numeral 250. This U-tube has the usual legs 251 and 252, interconnected by curved intermediate pipe segment 253. The leg 251 is closed at the end, excepting for the intake port from high impedance air intake pipe 254, fed preferably by blower 254a, and the leg 252 is closed, and has leading from its closed end portion a high impedance or quarter-wave discharge pipe 255. The latter discharges to a receiver 256, and if it is desired to maintain a back pressure on the reactor, this pipe 255 may contact a conventional spring-loaded check valve 257, located, for instance, at the far end of the pipe 255.

The closed end portion of the leg 251 functions as a combustion chamber 258, and fuel is fed thereto through a suitable orifice, such as indicated at 259. A spark plug 260 is employed for igniting the fuel mixture in the chamber 258, and may be energized by any conventional ignition system.

A steam pipe is indicated at 265, and has valve controlled branches 266 and 267 discharging into leg 251 into the combustion chamber region and into a downstream region of the leg 251, the latter more or less in the general region of the juncture with pipe section 253.

A catalyzer 270 is shown in the general region of the steam intake pipe 267.

For control of the temperature of the combustion gases in the leg 252, a water jacket 272 is provided around the U-tube ahead of said leg 252. The temperature in the U-tube, particularly in the region 253 and in the leg 252, may also be controlled by air introduced through a pipe 274 opening into U-tube section 253, preferably on the "inside" turn of the latter. If the system is operated at normal mean static pressure, that is, without blower pressure at the intake, air will be sucked into the pipe section 253 through this intake pipe 274 by suction owing to centrifugal force effects, as heretofore described. Otherwise, in the case of elevated mean static pressure within the U-tube, air may be introduced at 274 under blower pressure.

In the operation of the reactor, the raw material is intermittently ignited and burned in the combustion chamber 258, at the resonant frequency of the U-tube, operating as a half-wave length pipe. A standing wave is established in the U-tube, as in the earlier embodiments, with a pressure antinode P in the combustion chamber, a velocity antinode V at the mid-point of the U-tube, and another pressure antinode P′ in the closed end of the leg 252. The pressure of the gas in the tube thus undergoes 180° opposed pressure cycles at the pressure antinodes P and P′, and there is a region of gas oscillation at V. Depending upon whether or not the air is supplied to the system at an elevated pressure, the pressure cycles at P and P′ will have an approximately atmospheric mean static pressure, or a mean static pressure which may be elevated to a number of atmospheres.

In the embodiment of Figure 4, the gases produced within the combustion leg 251 of the reactor are subjected to catalytic hydrogenation within the opposite leg 252, at controlled temperature and at high amplitude pressure cycle having the frequency for which the U-tube is resonant. A suitable catalyzer is provided within the leg 252, as indicated generally at 276. This, of course, may be of any suitable physical or chemical type, and is here diagrammatically indicated as comprising a mounting plate 277 secured to the leg 252 over an aperture 278 and having a catalyst bed 279 mounted on the inside surface of the plate 277.

By introducing steam to the combustion chamber, carbon monoxide and hydrogen is formed in the leg 251, as heretofore described. These gaseous products circulate around the U-tube to the leg 252. If desired, some of the carbon monoxide may be catalytically reacted with steam to increase the ratio of hydrogen to carbon monoxide, and this is accomplished by use of a suitable catalyst at 270, and introduction of steam via pipe 267. The temperature of the gases is controlled by means of the water jacket 272. Thus, whereas combustion chambers within the leg 251 may be of the order of 3000° F., the temperature within the leg 252 may be reduced to a few hundred degrees Farenheit. The reduced temperature gases are received in the head end portion of the leg 252, where they contact the catalyst 279. These gases are subjected, as explained above, to a high intensity pressure cycle within leg 252, and are thus subjected to catalytic hydrogenation under influence of a sonic frequency pressure wave of high intensity. Under these conditions, the reaction proceeds rapidly and effectively, the reactions being particularly promoted by the sonic pressure wave. The reactions which will occur are generally of the type of Reactions 5, 6 and 7 given in the introductory part of the specification, but other desirable reactions may also occur as a result of adjustments imposed. The particular reactions in any given case will depend upon a number of variable factors, such as ratio of hydrogen to carbon monoxide, temperature, and pressure imposed, as well as, of course, the specific nature of the catalyst used. With knowledge now in the possession of the art, the operator may select the various factors at will, or by experimentation, giving different reactions and resulting hydrocarbon or oxygenated hydrocarbon products.

The products of the reaction within the leg 252 are drawn off through the outlet pipe 255, which has earlier been described as having high acoustic impedance, or a quarter-wave length. A short discharge pipe communicating openly with the pressure antinode region of the leg 252 would, without the use of some type of intermittently acting valve, dissipate the acoustic standing wave essential to the sonic reactor. However, by use of a discharge pipe 255 having a quarter-wave length for the sonic frequency of the U-tube, the gas column within the pipe 255 also supports a standing wave, one-quarter wave length in character, and a pressure antinode exists in the gas column in the pipe 255 at the junction of the latter with the leg 252 of the U-tube. Under these conditions, the standing wave in the U-tube is not dissipated, and gas flow can be taken off through pipe 255 continuously and without intermittently acting valves. The outlet pipe 255 need not be exactly quarter-wave length, so long as it has an acoustic impedance substantially as high as that of the U-tube at the junction point between the pipe 255 and the leg 252. Acoustic impedance is by definition the ratio of alternating pressure to gas oscillation velocity. When these ratios for the closed end portion of the leg 252 and the closed end of the discharge pipe 255 are substantially matched, the standing wave in the U-tube will not be dissipated. The acoustic impedance of the pipe 255 depends partly on its length, and partly on its diameter. The smaller the diameter, the higher the impedance. Thus, the discharge pipe 255, of length somewhat less than quarter-wave length, but of sufficiently small diameter to assure high acoustic impedance, will serve to draw off the products of the reaction without dissipation of the standing wave. This general subject is more fully discussed in my aforementioned co-pending application Serial No. 728,766, wherein a quarter-wave or high impedance intake pipe is fully described. The same principles apply equally to a discharge pipe, as will be quite evident to those skilled in the art.

Figure 5 shows another type of reactor in accordance with the invention, in this instance of spherical form, housing a gas body in which a radial standing wave is established. In this instance, the fuel is burned at the center of the spherical shell, and sends out radially traveling compression waves, and these waves are reflected by the inside surface of the sphere, to be returned toward the source as a focus. A second charge of fuel is burned at the center, or focus, coincidentally with the arrival of this reflected wave of compression, and a spherical type of standing wave is thus established, with a first pressure antinode P at the center, a second pressure antinode P' at the reflecting boundary, and a velocity antinode region V in space between the regions P and P'.

As specifically shown in Figure 5, the spherical shell is indicated at 300, and an air supply pipe 301 extends inwardly through this shell to support a short cylinder 302 at the center of the shell. The pipe 301 joins the cylinder 302 tangentially, so that air introduced through pipe 301 spins within the cylinder 302. A fuel feed pipe 303 introduces fluidized powdered raw material, as coal, to the turbulent space inside the cylinder 302, and a spark plug 304 mounted in the cylinder 302 ignites the charge. The pipe 301 is preferably a valveless, high impedance pipe, i. e., having an acoustic impedance as high as the center region of the gas body in the shell 300, and if it be desired to operate at an elevated mean pressure, a blower 306 may be employed to supply air under pressure to pipe 301. Otherwise, the pipe 301 may have its entrance mouth open to atmosphere.

A discharge pipe 308 takes off gaseous products from velocity antinode region V, and another discharge pipe 309 is shown as positioned to take off products of combustion immediately adjacent the pressure antinode region P. A third discharge pipe 310 takes off products from the pressure antinode region P'. The pipe 309, connecting into the region P, should be sufficiently long to have an acoustic impedance substantially as high as that of the gas body in the region P; and the pipe 310 should be long enough to have an acoustic impedance as high as that in the region P'.

The processes described hereinabove may be carried out in this different form of apparatus. Fuel charges consisting of mixtures of powdered fuel, for example, powdered coal, and air are introduced periodically or continuously, by way of fuel feed pipe 302, and air is supplied through air supply pipe 301, the amount of air being controllable by means of butterfly valve 310.

To initiate operation, the spark plug 304 is energized and explodes the first fuel charge. This explosion sends a spherical radially traveling wave of compression to the wall of the spherical shell 300. This wave is reflected back towards the source, and builds up a second pressure peak upon arriving back at P. This compression peak results in an explosion of the fuel charge introduced in the interim, so that an augmented pressure peak is produced, sending out another radially traveling wave of compression. This cycle is then repeated at the resonant frequency of the gas body in the spherical shell. It will be seen that a standing wave is established, having pressure antinodes P and P' and velocity antinode V, positioned as indicated in the drawings.

Products of combustion may be drawn off through pipe 308, having an intake mouth located in the velocity antinode region of the sphere. Such a pipe need have no valve, unless it be desired to operate at an elevated mean pressure, in which case a spring-loaded back pressure valve (not shown) would be used in the pipe 308. Also shown are discharge pipes 309 and 310, taking products of combustion from a point closely adjacent the combustion region, and from the outer pressure antinode region P', respectively, and such pipes, in order to avoid loss of wave energy, are designed to have high acoustic impedance, as earlier discussed. An advantage in the use of the pipe 309 is that it may draw off products of combustion from an inner region of the apparatus, where the combustion may not be entirely completed. For example, if, under any conditions of operation, the fuel charge tends to be largely burned to carbon dioxide and water by the time the velocity antinode region V is reached, there may still be regions closer to the point of combustion at which carbon monoxide predominates, and the pipe 309 reaches into this region and takes off the desired product.

The other auxiliary equipment described in connection with other embodiments of the invention may easily be employed with the spherical form of apparatus of Figure 5. Thus, as will be evident, pipes may be employed for introducing reagents to various regions of the shell, catalytic structures may be mounted therein, etc.

The reactors and processes described herein are particularly useful for carrying out reactions of the types given hereinabove, such as for gasification of powdered and fluidized carbonaceous raw materials to produce carbon monoxide, mixtures of carbon monoxide and hydrogen, and synthetic hydrocarbon or oxygenated products. They promote, accelerate, and shift the equilibrium of such reactions by reason of the high intensity sonic pressure and velocity cycles maintained within the reaction regions of the apparatus.

As heretofore stated, the particular temperatures, pressures, catalysts, and the various reagents used in the making of synthetic hydrocarbons, are subject to wide variation to give different end products, as will be understood by and will be within the skill of those versed in the art. Some indication of typical operating conditions will nevertheless be given, though without intention of limiting the scope of the invention.

The particular product obtainable by catalytic hydrogenation of carbon monoxide at any temperature depends partly upon hydrogen-carbon monoxide ratio, catalyst used and pressure, but, in general, it is known that straight chain hydrocarbons are obtained in the range 300°–500° F., alcohols in the range 575°–750° F., isoparaffins in the range 750°–885° F., and aromatics in the range 885°–930° F.

The useful operating pressures are not critical and can range from atmospheric to several thousand pounds per square inch, depending largely upon the catalyst. Different reactions, of course, occur at optimum rate at different pressures, and some proceed best in a range as high as from 4000 to 5000 pounds per square inch.

As earlier explained, the standing sound wave maintained within the gas body or column has a varying pressure cycle at one region, the pressure antinode, and this cycle diminishes to zero amplitude toward another region, the velocity antinode. This pressure cycle swings above and below a mean pressure level, which may be close to atmospheric, or considerably elevated above atmospheric. I have previously had reference to "mean static pressure," which term, strictly speaking, denotes the internal pressure which would exist within the system in a quiescent state, i. e., with no sound wave. For example, this mean static pressure might be atmospheric pressure, if no blower is used for air supply; or it might be considerably elevated using blower pressure, and a back-pressure holding valve at the discharge. Mean operating pressure, with the standing wave established, will in general somewhat exceed mean static pressure at the pressure cycle regions, and will tend to be less than static at the velocity antinode regions.

The magnitude of the pressure swing above and below a mean operating pressure increases with increased mean static pressure. Thus, with a mean static pressure of one atmosphere, the positive pressure peak will easily reach 40 pounds per square inch, while with a mean static pressure of 200 pounds per square inch, the peak positive pressure can reach or somewhat exceed 500 pounds per square inch.

The catalytic hydrogenation of synthesis gases is usually carried out at medium pressures, i. e., 75–220 pounds per square inch. According to my invention, this reaction may be carried out in a velocity antinode region (Figure 3), where pressure is substantially static mean pressure, or in a pressure antinode region (Figure 4), where the mean pressure somewhat exceeds static mean, and large pressure swings are imposed. In the first case, the static mean pressure is set to the desired operating pressure, and the main value of the sound wave to the reaction is evidently the high velocity of the oscillating gases scrubbed back and forth along the catalyst. In the second case, the pressure swings up and down about the operating mean. By establishing a mean static pressure of 80 pounds per square inch, I have a positive pressure peak approaching 220 pounds per square inch. The negative pressure half cycle will then drop the pressure to about 40 pounds per square inch, so that I have a resonant frequency pressure swing covering the range from 40–220 pounds per square inch.

The higher pressures favor the production of oxygenated compounds, and choice of proper temperature and high pressure, together with the proper catalysts, provide conditions under which the isoparaffins can be obtained. For example, the latter reaction has been obtained in known apparatus with a pressure of 4,400 pounds per square inch. With the present process (reacting in a pressure antinode zone) the mean pressure may be lower, but the pressure swing will cover a substantial range. Thus, as an example, mean pressure may be 2,500 pounds per square inch, giving a pressure swing over the approximate range of 1,200–6,000 pounds per square inch.

In general, my sonic process and reaction chamber provide conditions under which any of the known reactions of the types herein referred to, namely, burning of raw materials to produce CO, reacting with steam to produce hydrogen, catalytic hydrogenation of H and CO, oxygenation, hydroforming, etc., can be promoted and accelerated, and the equilibrium points of the different reactions desirably shifted, owing to the high amplitude pressure and velocity cycling. Those having a knowledge of these reactions can, with the teachings given herein, perform any of them under the improved conditions provided by the present invention.

It has been mentioned earlier that the present process consumes powdered coal at an unprecedented rate. The present process and apparatus has a corresponding high through-put rate, giving high plant output. Under certain circumstances, this high through-put rate has incidental but important advantages. It is known, for example, that high through-put rate favors the production of oxygenated compounds. Also, high space velocity favors the production of olefins.

The invention has now been described as embodied in several typical and illustrative embodiments and with reference to certain specific reactions. These embodiments and specific reactions are to be considered as illustrative and not limitative, however, and the invention is not deemed to be limited in scope excepting as expressed in the appended claims. It is also to be noted that, while I have shown several forms of physical apparatus, each equipped with a selection of certain auxiliary apparatus, such as air intake devices, feed pipes, product discharge devices, valves, catalysts, etc., these various auxiliary devices may each and all be used in connection with any one or all of the main illustrative embodiments, as will readily be apparent to those skilled in the art.

I claim:

1. The process of producing carbon monoxide from a powdered carbonaceous fuel such as coal and the like, that comprises: periodically burning successive rich mixture charges of the powdered fuel and air within, and at instants of peak positive pressure at, a pressure antinode region of a confined resonant gas column undergoing the pressure and velocity cycles of a standing sound wave maintained in said column by such burning, and drawing off the products of combustion from said gas column.

2. The process of producing carbon monoxide from a powdered carbonaceous fuel such as coal and the like, that comprises: periodically burning successive rich mixture charges of the powdered fuel and air within, and at instants of peak positive pressure at, a pressure antinode region of a confined resonant half wavelength sonic gas column undergoing the pressure and velocity cycles of a standing sound wave maintained in said column by such burning, and drawing off the products of combustion from said gas column.

3. The process of producing carbon monoxide from a powdered carbonaceous fuel such as coal and the like, that comprises: periodically burning successive rich mixture charges of the powdered fuel and air within, and at instants of peak positive pressure at, each of the pressure antinode regions of a confined half wavelength sonic gas column undergoing the pressure and velocity cycles of a standing sound wave maintained in said column by such burning, and drawing off the products of combustion from said gas column.

4. The process of producing carbon monoxide from a powdered carbonaceous fuel such as coal and the like, that comprises: periodically burning successive rich mixture charges of the powdered fuel and air within, and at instants of peak positive pressure at, a pressure antinode region of a confined resonant half wavelength sonic gas column undergoing the pressure and velocity cycles of a standing sound wave, periodically burning mixtures of hydrocarbon fuel and air within, and at instants of peak positive pressure at, the other pressure antinode region of the gas column, all in such manner as to maintain said standing wave by such burning, and drawing off the products of combustion from said gas column.

5. The process of producing carbon monoxide from a powdered carbonaceous fuel such as coal and the like, that comprises: periodically burning successive rich mixture charges of the powdered fuel and air within, and at instants of peak positive pressure at, a pressure antinode region of a confined resonant gas body undergoing the pressure and velocity cycles of a standing sound wave maintained in said body by such burning, and drawing off the products of combustion from said gas body.

6. The process of producing carbon monoxide from a powdered carbonaceous fuel such as coal and the like, that comprises: periodically burning successive rich mixture charges of the powdered fuel and air within, and at instants of peak positive pressure at, a pressure antinode region of a confined resonant gas body undergoing the pressure and velocity cycles of a standing sound wave maintained in said body by such burning, and drawing off the products of combustion from a velocity antinode region of said gas body.

7. The process of producing carbon monoxide from a powdered charbonaceous fuel such as coal and the like, that comprises: periodically burning successive rich mixture charges of the powdered fuel and air within, and at instants of peak positive pressure at, a pressure antinode region of a confined resonant gas body undergoing the pressure and velocity cycles of a standing sound wave maintained in said body by such burning, and drawing off the products of combustion from another pressure antinode zone of said gas body.

8. The process of producing carbon monoxide from a powdered carbonaceous fuel such as coal and the like, that comprises: periodically burning successive rich mixture charges of the powdered fuel and air within, and at instants of peak positive pressure at, a pressure antinode region of a confined resonant gas body undergoing the pressure and velocity cycles of a standing sound wave maintained in said body by such burning, and drawing off the products of combustion from a plurality of regions of said standing wave.

9. The process of producing carbon monoxide from a powdered carbonaceous fuel such as coal and the like, that comprises: periodically burning successive rich mixture charges of the powdered fuel and air within, and at instants of peak positive pressure at, a pressure antinode region of a confined resonant gas body undergoing the pressure and velocity cycles of a standing sound wave maintained in said body by such burning, and drawing off the products of combustion from a position within said gas body in the general region of said pressure antinode.

10. The process of producing carbon monoxide from a powdered carbonaceous fuel such as coal and the like, that comprises: forming a fluidized stream of the powdered fuel and air, feeding said stream to a pressure antinode region of a confined resonant gas body undergoing the pressure and velocity cycles of a standing wave, periodically burning the fluidized fuel so introduced to said pressure antinode region in a deficiency of air at instants of peak positive pressure thereat, thereby driving said standing wave by the periodically released heat, and drawing off the resulting products of combustion from the gas body.

11. The process of producing carbon monoxide from a powdered carbonaceous fuel such as coal and the like, that comprises: periodically forming rich mixture charges of the powdered fuel and air in the pressure antinode region of a resonant sonic reaction chamber, periodically burning the fuel charges at said pressure antinode region at a resonant frequency of the chamber thereby driving said standing wave by the periodically released heat, and drawing off products of the combustion from the chamber.

12. The process of producing carbon monoxide from a powdered carbonaceous fuel such as coal and the like, that comprises: periodically forming rich mixture charges of the powdered fuel and air in the pressure antinode region of a resonant sonic gas conduit in which a standing sound wave can be established, burning the charges at said pressure antinode region of the conduit at a resonant frequency of the conduit thereby establishing and driving said standing wave by the periodically released heat, and drawing off products of combustion from the conduit.

13. The process of gasifying a powdered solid carbonaceous combustible raw material such as coal and the like, that comprises: periodically burning successive rich mixture charges of the powdered raw material and air within, and at instants of peak pressure at, a pressure antinode region of a confined resonant gas body undergoing the pressure and velocity cycles of a standing sound wave maintained in said body by such burning, injecting steam into the general region of said pressure antinode for reaction with the heated carbon of the raw material to produce carbon monoxide and hydrogen, and drawing off the products of the reaction from the gas body.

14. The process of gasifying a powdered solid carbonaceous combustible raw material such as coal and the like, that comprises: periodically burning successive rich mixture charges of the powdered raw material and air within, and at instants of peak pressure at, a pressure antinode region of a confined resonant gas column undergoing the pressure and velocity cycles of a standing sound wave of at least half-wave length maintained in said column by such burning, injecting steam into the general region of said pressure antinode for reaction with the heated carbon of the raw material to produce carbon monoxide and hydrogen, and drawing off the products of the reaction from the gas column.

15. The process of gasifying a powdered solid carbonaceous combustible raw material such as coal and the like, that comprises: periodically burning successive rich mixture charges of the powdered raw material and air within, and at instants of peak pressure at, a pressure antinode region of a confined resonant gas column undergoing the pressure and velocity cycles of a standing sound wave maintained in said column by such burning, injecting steam into the general region of said pressure antinode for reaction with the heated carbon of the raw material to produce carbon monoxide and hydrogen, and drawing off the products of the reaction from a velocity antinode region of the gas column.

16. The process of gasifying a carbonaceous combustible raw material, that comprises: periodically burning successive rich mixture charges of the raw material and air within, and at instants of peak positive pressure at, a pressure antinode region of a confined resonant gas column undergoing the pressure and velocity cycles of a standing sound wave maintained in said column by such burning, thereby producing carbon monoxide, withdrawing gaseous products from the gas column from a point spaced along said column from said pressure antinode, so as to establish a longitudinal flow of said carbon monoxide along said gas column, whereby said carbon monoxide is subjected to the pressure and velocity oscillations of the standing sound wave maintained along the gas column, and introducing reagents into said gas column to react with said carbon monoxide during its longitudinal travel along said gas column, and while it is being subjected to said pressure and velocity oscillations of said standing sound wave.

17. The process of gasifying a powdered solid carbonaceous combustible raw material such as coal and the like, that comprises: periodically burning successive rich mixture charges of the powdered raw material and air within, and at instants of peak positive pressure at, a pressure antinode region of a confined resonant gas column undergoing the pressure and velocity cycles of a standing sound wave maintained in said column by such burning, thereby producing carbon monoxide, withdrawing gaseous products from the gas column from a point spaced along said column from said pressure antinode, so as to establish a longitudinal flow of said carbon monoxide along said gas column, whereby said carbon monoxide is subjected to the pressure and velocity oscillations of the standing sound wave maintained along the gas column, and catalytically reacting the carbon monoxide with steam during its longitudinal travel along said gas column, and while it is being subjected to said pressure and velocity oscillations of said standing sound wave.

18. The process of producing synthetic hydrocarbon products from a powdered solid carbonaceous raw material such as coal and the like, that comprises: periodically burning successive rich mixture charges of the powdered raw material and air within, and at instants of peak positive pressure at, a pressure antinode region of a confined resonant gas column undergoing the pressure and velocity cycles of a standing sound wave maintained in said column by such burning, thereby producing carbon monoxide, establishing a flow of said carbon monoxide longitudinally along said gas column in a direction away from said pressure antinode region, reacting steam with heated carbon in the gas column to produce hydrogen flowing along said gas column in a mixture with said carbon monoxide, effecting hydrogenation of the mixture of hydrogen and carbon monoxide by contacting said mixture with a catalyst at a region of said gas column which is subject to said standing sound wave, and withdrawing the products of hydrogenation from the gas column.

19. The process of producing synthetic hydrocarbon products from a powdered solid carbonaceous raw material such as coal and the like, that comprises: periodically burning successive rich mixture charges of the powdered raw material and air within, and at instants of peak positive pressure at, a pressure antinode region of a confined resonant gas column undergoing the pressure and velocity cycles of a standing sound wave maintained in said column by such burning, thereby producing carbon monoxide, establishing a flow of said carbon monoxide longitudinally along said gas column in a direction away from said pressure antinode region, reacting steam with heated carbon in the gas column to produce hydrogen flowing along said gas column in a mixture with said carbon monoxide, effecting hydrogenation of the mixture of hydrogen and carbon monoxide by contacting said mixture with a catalyst within a velocity antinode region of said gas column whereby the gases undergo a substantial velocity oscillation cycle, and withdrawing the products of hydrogenation from the gas column.

20. The process of producing synthetic hydrocarbon products from a powdered solid carbonaceous raw material such as coal and the like, that comprises: periodically burning successive rich mixture charges of the powdered raw material and air within, and at instants of peak positive pressure at, a pressure antinode region of a confined resonant gas column undergoing the pressure and velocity cycles of a standing sound wave maintained in said column by such burning, thereby producing carbon monoxide, establishing a flow of said carbon monoxide longitudinally along said gas column in a direction away from said pressure antinode region, reacting steam with heated carbon in the gas column to produce hydrogen flowing along said gas column in a mixture with said carbon monoxide, effecting hydrogenation of the mixture of hydrogen and carbon monoxide by contacting said mixture with a catalyst within a second pressure antinode region of said gas column whereby the gases undergo a pressure oscillation cycle, and withdrawing the products of hydrogenation from the gas column.

21. The process of producing synthetic hydrocarbon products from a powdered solid carbonaceous raw material such as coal and the like, that comprises: periodically burning successive rich mixture charges of the powdered raw material and air within, and at instants of peak positive pressure at, a pressure antinode region of a confined resonant gas column undergoing the pressure and velocity cycles of a standing sound wave maintained in said column by such burning, thereby producing carbon monoxide, establishing a flow of said carbon monoxide longitudinally along said gas column in a direction away from said pressure antinode region, reacting steam with heated carbon in the gas column to produce hydrogen flowing along said gas column in a mixture with said carbon monoxide, cooling said mixture of hydrogen and carbon monoxide to a temperature at which said gases can be catalytically hydrogenated, effecting hydrogenation of the mixture of hydrogen and carbon monoxide by contacting the cooled mixture of hydrogen and carbon monoxide with a catalyst at a region of said gas column which is subject to said standing sound wave, and withdrawing the products of hydrogenation from the gas column.

22. The process of producing synthetic hydrocarbon products from a powdered solid carbonaceous raw material such as coal and the like, that comprises: periodically burning successive rich mixture charges of the powdered raw material and air within, and at instants of peak positive pressure at, a pressure antinode region of a confined resonant gas column undergoing the pressure and velocity cycles of a standing sound wave maintained in said column by such burning, thereby producing carbon monoxide, establishing a flow of said carbon monoxide longitudinally along said gas column in a direction away from said pressure antiode region, mixing hydrogen with said carbon monoxide, effecting hydrogenation of the mixture of hydrogen and carbon monoxide by contacting said mixture with a catalyst at a region of said gas column which is subject to said standing sound wave, and withdrawing the products of hydrogenation from the gas column.

23. The process of producing synthetic hydrocarbon products from a powdered solid carbonaceous raw material such as coal and the like, that comprises: periodically burning successive rich mixture charges of the powdered raw material and air within, and at instants of peak positive pressure at, a pressure antinode region of a confined resonant gas column undergoing the pressure and velocity cycles of a standing sound wave maintained in said column by such burning, thereby producing carbon monoxide, establishing a flow of said carbon monoxide longitudinally along said gas column in a direction away from said pressure antinode region, mixing hydrogen with said carbon monoxide, effecting hydrogenation of the mixture of hydrogen and carbon monoxide by contacting said mixture with a catalyst within a velocity antinode region of said gas column whereby the gases undergo a substantial velocity oscillation cycle, and drawing the products of hydrogenation from the gas column.

24. The process of producing synthetic hydrocarbon products from a powdered solid carbonaceous raw material such as coal and the like, that comprises: periodically burning successive rich mixture charges of the powdered raw material and air within, and at instants of peak positive pressure at, a pressure antiode region of a confined resonant gas column undergoing the pressure and velocity cycles of a standing sound wave maintained in said column by such burning, thereby producing carbon monoxide, establishing a flow of said carbon monoxide longitudinally along said gas column in a direction away from said pressure antinode region, mixing hydrogen with said carbon monoxide, effecting hydrogenation of the mixture of hydrogen and carbon monoxide by contacting said mixture with a catalyst within a second pressure antinode region of said gas column whereby the gases undergo a pressure oscillation cycle, and withdrawing the products of hydrogenation from the gas column.

25. In a sonic burner, the combination of: a gas conduit having a resonant frequency at which a longitudinal standing sound wave can be set up therein, with at least two pressure antinode regions and an intervening velocity antinode region, said conduit having a substantial longitudinal bend in the region of said velocity antinode, whereby centrifugal force effects are exerted upon products traveling longitudinally through said velocity antinode regions and past said bend, means for introducing fuel and air mixtures into the pressure antinode region in one end portion of said conduit and for burning said mixture at said pressure antinode region, so as to set up periodic compression and consequent fuel combustion at the resonant frequency of the conduit, thereby establishing and maintaining said standing wave, an ash trap communicating with said conduit in the region of said longitudinal bend and on the outside of said bend, so as to collect ash particles thrown outwardly from the gas stream in the conduit by centrifugal force upon traversing said longitudinal bend, and means for withdrawing gaseous products of combustion from another region of said conduit.

26. In a sonic burner, the combination of: a gas conduit having a resonant frequency at which a longitudinal standing sound wave can be set up therein, with at least two pressure antinode regions and an intervening velocity antinode region, said conduit having a substantial longitudinal bend in the region of said velocity antinode, whereby centrifugal force effects are exerted upon products traveling longitudinally through said velocity antinode regions and past said bend, means for introducing fuel and air mixtures into the pressure antinode region in one end portion of said conduit and for burning said mixture at said pressure antiode region, so as to set up periodic compression and consequent fuel combustion at the resonant frequency of the conduit, thereby establishing and maintaining said standing wave, an ash trap communicating with said conduit in the region of said longitudinal bend and on the outside of said bend, so as to collect ash particles thrown outwardly from the gas stream in the conduit by centrifugal force upon traversing said longitudinal bend, and means for withdrawing gaseous products of combustion from the velocity antinode region of the conduit from a point therein spaced inward from the plane of communication between the conduit and ash trap.

(References on following page)

References Cited in the file of this patent

UNITED STATES PATENTS

| | | |
|---|---|---|
| 1,860,138 | Cross | May 24, 1932 |
| 2,087,391 | Toulmin, Jr. | July 20, 1937 |
| 2,347,682 | Gunness | May 2, 1944 |
| 2,388,348 | Stimson | Nov. 6, 1945 |
| 2,546,966 | Bodine, Jr. | Apr. 3, 1951 |
| 2,690,960 | Kistiakowsky et al. | Oct. 5, 1954 |

FOREIGN PATENTS

| | | |
|---|---|---|
| 823,231 | France | Oct. 11, 1937 |